United States Patent
Bennett et al.

(10) Patent No.: US 9,242,506 B2
(45) Date of Patent: Jan. 26, 2016

(54) MODULAR CENTER CAP ASSEMBLY FOR WHEELS

(71) Applicant: Omix-Ada, Inc., Suwanee, GA (US)

(72) Inventors: Patrick W. Bennett, Gainesville, GA (US); Alain Eboli, Lawrenceville, GA (US)

(73) Assignee: Omix-Ada, Inc., Suwanee, GA (US)

( * ) Notice: Subject to any disclaimer, the term of this patent is extended or adjusted under 35 U.S.C. 154(b) by 229 days.

(21) Appl. No.: 14/019,876

(22) Filed: Sep. 6, 2013

(65) Prior Publication Data

US 2015/0069821 A1    Mar. 12, 2015

(51) Int. Cl.
*B60B 7/04* (2006.01)
*B60B 7/00* (2006.01)
*B60B 7/08* (2006.01)

(52) U.S. Cl.
CPC ............... *B60B 7/0013* (2013.01); *B60B 7/04* (2013.01); *B60B 7/08* (2013.01); *B60B 2900/541* (2013.01)

(58) Field of Classification Search
CPC ...... B60B 7/0013; B60B 7/04; B60B 7/0053; B60B 7/063; B60B 7/066
USPC ............... 301/37.106, 37.102, 37.107, 37.43, 301/37.26
See application file for complete search history.

(56) References Cited

U.S. PATENT DOCUMENTS

| | | |
|---|---|---|
| 2,188,911 A | 2/1940 | Lyon |
| 3,869,175 A | 3/1975 | Spisak |
| 4,040,672 A | 8/1977 | Imahashi |
| 4,235,476 A | 11/1980 | Arvidsson |
| 4,295,685 A | 10/1981 | Spisak |
| 4,460,219 A | 7/1984 | Sepanik |
| 4,781,419 A | 11/1988 | Boothe |
| 5,316,376 A | 5/1994 | Defreitas |
| 5,443,582 A | 8/1995 | Ching |
| 6,779,852 B2 * | 8/2004 | Van Houten et al. ...... 301/37.43 |
| 6,969,124 B2 | 11/2005 | Gerard |
| 7,055,915 B2 | 6/2006 | Fitzgerald |
| 7,416,260 B1 * | 8/2008 | Cuevas et al. .............. 301/37.43 |
| 8,162,406 B2 * | 4/2012 | Heck et al. ................. 301/37.43 |
| 8,764,120 B2 | 7/2014 | Scicluna |
| 2007/0228807 A1 | 10/2007 | Leslie et al. |
| 2010/0194181 A1 | 8/2010 | Noriega |
| 2010/0270853 A1 | 10/2010 | Smith |

* cited by examiner

*Primary Examiner* — Hau Phan
(74) *Attorney, Agent, or Firm* — Womble Carlyle Sandridge & Rice LLP

(57) ABSTRACT

A modular cap assembly for covering a center bore of a wheel includes an outer piece having a first outward face with a cap retention structure formed therein, a first inward face, and a plurality of first mounting clips projecting from the first inward face to removably engage a wheel retention structure and couple the outer piece to the wheel. The cap assembly also includes a center piece having a second outward face, a second inward face, and a plurality of second mounting clips projecting from the second inward face to removably engage, one at a time, both the cap retention structure and the wheel retention structure. The second outward face is spaced from a wheel face when the center piece and outer piece are together coupled to the wheel and substantially flush with the wheel face when the center piece is coupled directly to the wheel.

20 Claims, 5 Drawing Sheets

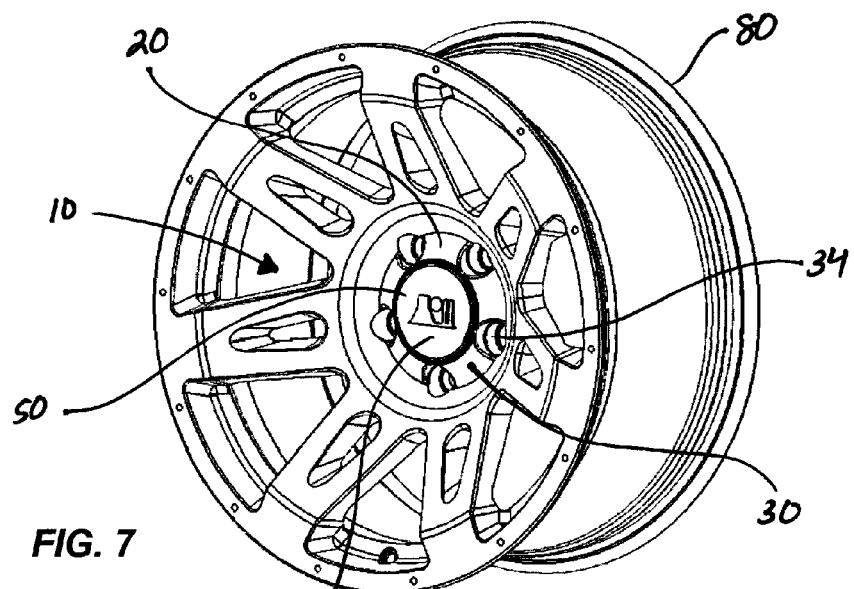
FIG. 7
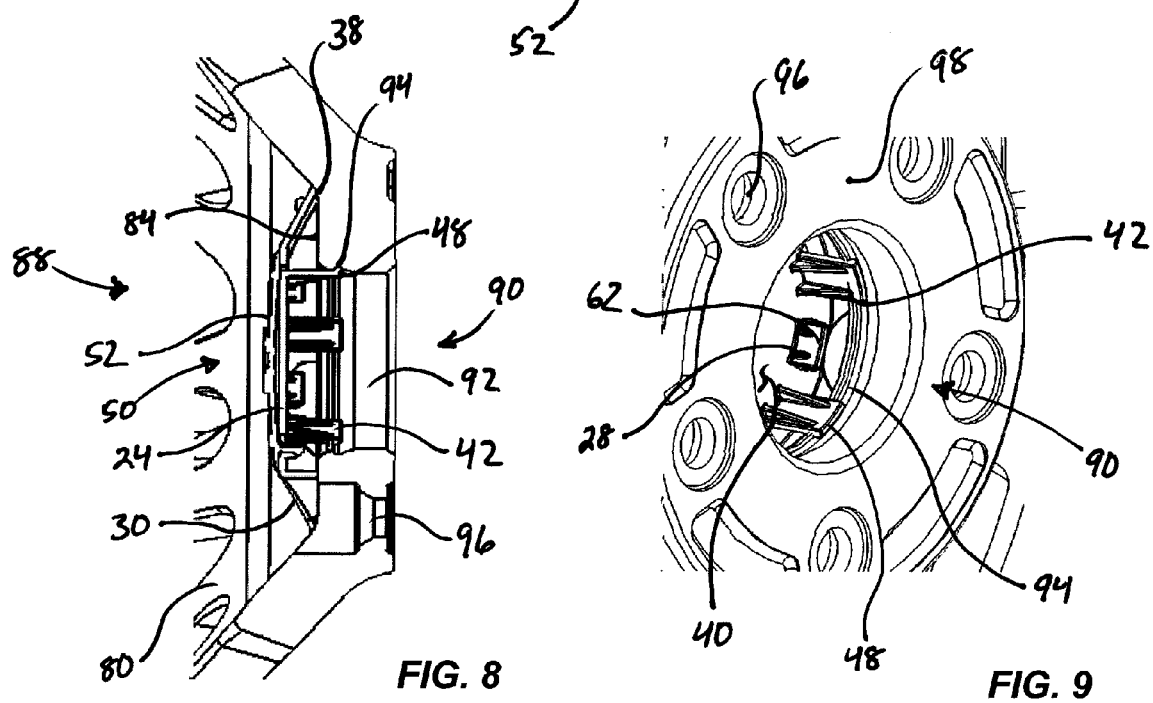
FIG. 8
FIG. 9

MODULAR CENTER CAP ASSEMBLY FOR WHEELS

TECHNICAL FIELD

This disclosure relates generally to wheels for vehicles, and in particular to center caps for covering the center bores formed into the wheels.

BACKGROUND

Many wheels for passenger and off-road vehicles generally comprise a center bore that at least partially receives the end of the axle when the wheel is secured to a hub assembly surrounding the axle. The center bore can be carefully sized to receive and support the axle, and hence the weight of the vehicle, while the lug nuts and threaded studs hold the inner face of the wheel against a hub flange. While some wheel designs leave the center bore and the tip of the axle exposed to ambience, other wheel designs cover the center bore with a hub cap or center cap that serves to prevent or limit moisture, oil, grease, dirt and sand from coming into contact with the center bore, and possibly working their way into the clearance between the end of the axle and the inside cylindrical surface of the center bore to cause damage or premature wear to the outer surface of the axle or the inside cylindrical surface of the wheel.

However, many wheels use a singular design for the hub cap or center cap that cannot be changed without replacing the entire wheel, and that may not be suitable for all operating conditions (e.g. city driving, off-roading, desert sand, etc.). This limits the options available to the vehicle's owner for both customizing the protection system to better meet changing operating conditions, and for altering the aesthetic appearance of the wheels. Consequently, a need exists for a modular center cap or center cap system that allows the center cap to be altered or replaced without replacing the entire wheel. It is toward such a modular center cap that the present disclosure is directed.

SUMMARY

Briefly described, one embodiment of the present disclosure includes a modular cap assembly for covering a center bore of a wheel. The modular cap assembly includes an outer piece having a first outward face with a cap retention structure formed therein, a first inward face, and a plurality of first mounting clips projecting from the first inward face to removably engage a wheel retention structure and couple the outer piece to the wheel. The cap assembly also includes a center piece having a second outward face, a second inward face, and a plurality of second mounting clips projecting from the second inward face to removably engage, one at a time, both the cap retention structure and the wheel retention structure. In one aspect, the center piece can be mounted to the outer piece and the cap assembly can then be mounted to the wheel. In another aspect, the center piece can be coupled directly to the wheel without an intervening outer piece. When the center piece and outer piece are together coupled to the wheel, the second outward face of the center piece is spaced form the face of the wheel, or wheel face, and the cap assembly provides a high profile appearance. When the center piece is coupled directly to the wheel, the second outward face can be substantially flush with the wheel face and provide a low profile appearance.

Another embodiment of the present disclosure comprises a system for covering a center bore of a wheel that includes a wheel having a center plate, a center bore formed through the center plate, and a wheel retention structure formed in the center plate and proximate the center bore. The system also includes an outer piece having a first outward face with a cap retention structure formed therein, a first inward face, and a plurality of first mounting clips projecting from the first inward face and that are adapted to removably engage the wheel retention structure and couple the outer piece to the wheel. The system further includes a center piece having a second outward face, a second inward face, and a plurality of second mounting clips projecting from the second inward face and that are adapted to removably engage, one at a time, both the cap retention structure and the wheel retention structure. In addition, the second outward face of the center piece is spaced from the front face of the center plate when the center piece and outer piece are together coupled to the wheel, and is substantially flush with the front face when the center piece is coupled directly to the wheel.

The invention will be better understood upon review of the detailed description set forth below taken in conjunction with the accompanying drawing figures, which are briefly described as follows.

BRIEF DESCRIPTION OF THE DRAWINGS

FIG. 7 is a front perspective view of the modular center cap assembly of FIG. 1 coupled to the center bore of the wheel of FIG. 3.

FIG. 8 is a close-up, cross-sectional side view of the modular center cap assembly and center bore of FIG. 7.

FIG. 9 is a close-up, rear perspective view of the modular center cap assembly and center bore of FIG. 7.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Illustrated in FIGS. 1-12 is a representative embodiment of a modular center cap assembly or center cap system for coupling around and covering the center bore of a wheel of a vehicle. As disclosed in detail below, the modular center cap assembly can provide significant advantages and benefits over other center cap systems and methods for coupling center caps to wheels. However, the recited advantages are not meant to be limiting in any way, as one skilled in the art will appreciate that other advantages may also be realized upon practicing the present disclosure. It is also to be appreciated that the modular center cap assembly may not be limited only to uses relating to the wheels of vehicles, and that other uses and applications are also possible and may be considered to fall within the scope of the present disclosure.

Figure 1:
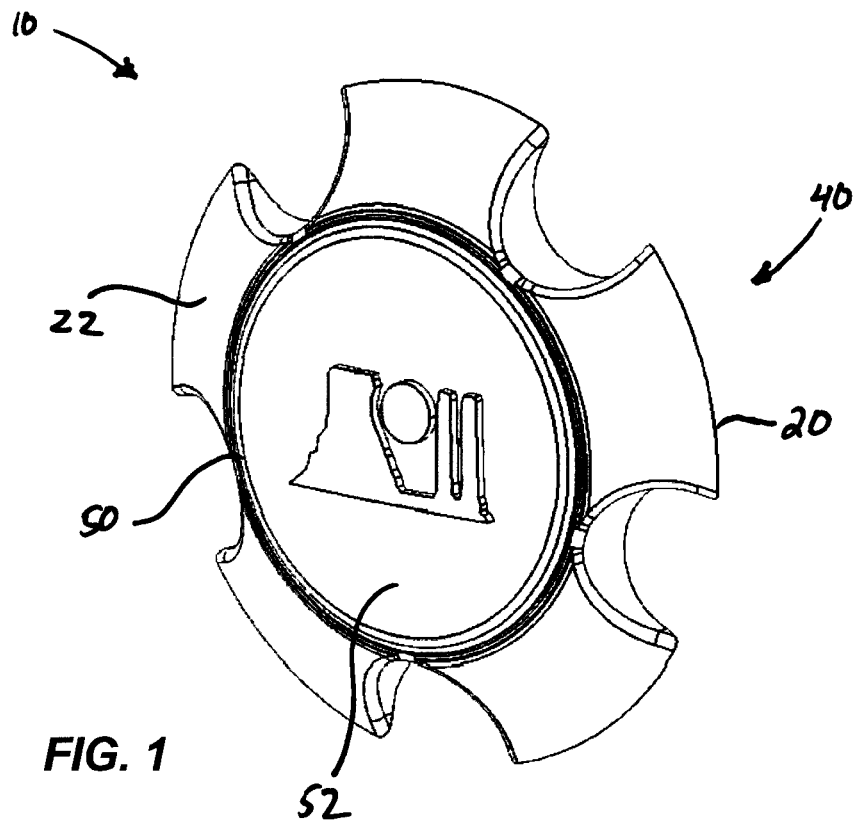
FIG. 1 is a front perspective view of a modular center cap assembly, in accordance with a representative embodiment.
Figure 2:
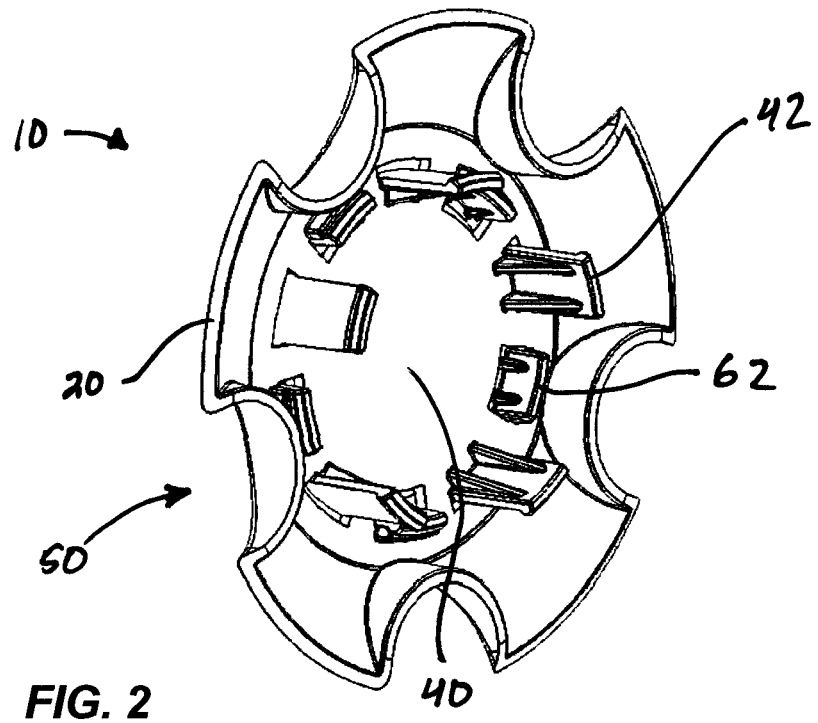
FIG. 2 is a rear perspective view of the modular center cap assembly of FIG. 1.

Referring now in more detail to the drawing figures, wherein like parts are identified with like reference numerals throughout the several views, FIGS. 1 and 2 together illustrate a modular center cap assembly 10 for covering the center bore formed into the center plate of a wheel (not shown). The center cap assembly 10 generally includes an outer piece 20 and a center piece 50, with the center piece 50 being mounted to a first outward face 22 of the outer piece 20. In addition to the first outward face 22, the outer piece 20 also includes a first inward face 40 and a plurality of first mounting clips 42 projecting from the first inward face 40. The first mounting clips 42 are configured to removably engage with a wheel retention structure formed into the wheel and couple the outer piece 20 to the wheel.

The center piece 50 includes a second outward face 52, a second inward face, 60 and a plurality of second mounting clips 62 projecting from the second inward face to removably engage either a cap retention structure 26 formed into the outer piece 20 or the wheel retention structure. Consequently, the center piece 50 can either be mounted to the outer piece 20 that is in turn mounted to the wheel, or the center piece 50 can be coupled directly to the wheel without the intervening outer piece 20. When the center piece 50 and outer piece 20 are together coupled to the wheel, the second outward face 52 of the center piece can be raised above or spaced from the front face of the wheel, or wheel face. When the center piece 50 is coupled directly to the wheel, however, the second outward face 52 can be substantially flush with the wheel face.

Figure 3:
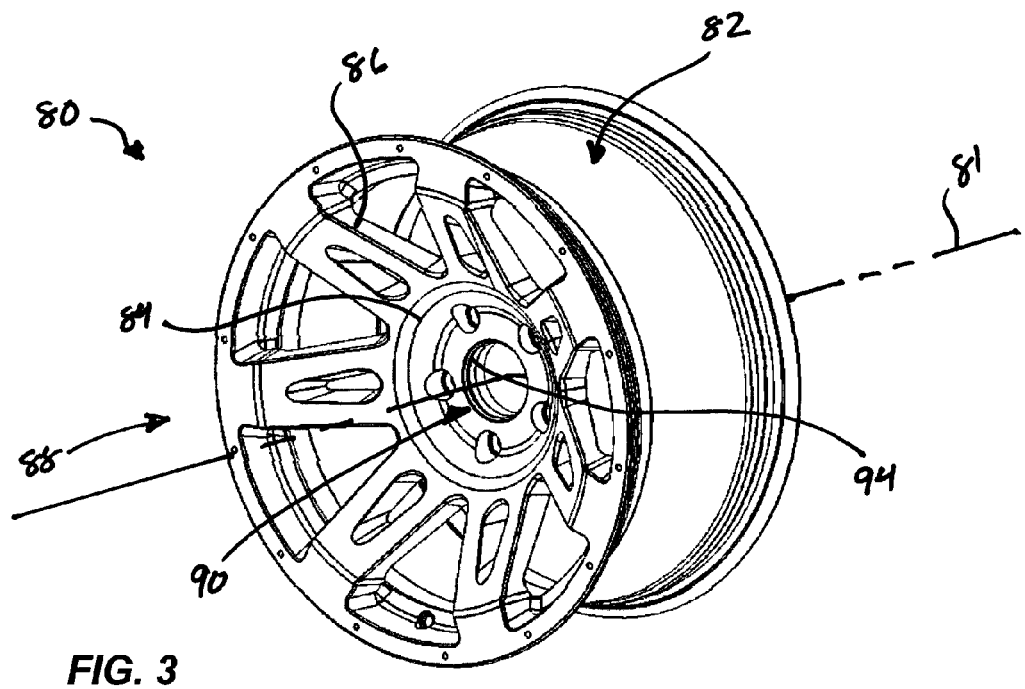
FIG. 3 is front perspective view of a wheel that is configured to receive the modular center cap assembly of FIG. 1.

FIG. 3 is a front perspective view of a wheel 80 that is configured to receive the modular center cap assembly 10 of FIGS. 1-2. The wheel 80 includes a rim 82 for a tire (not shown) that is supported around a center plate 84 by a plurality of spokes 86 extending between the rim 82 and the center plate 84. As known to one of skill in the art, the center plate 84 is generally offset inwardly in the direction of a centerline axis 81 of the wheel 80, so that center plate 84 is located interior to the barrel or cylindrically-shaped volume of the wheel that is defined by the rim 82, and the spokes 86 are angled axially forward and outward from the center plate 84 to the rim 82. The exposed front surfaces of the rim 82, spokes 86 and center plate 84 can define the front face 88 of the wheel 80.

As shown in the drawings, the center plate 84 of the wheel 80 includes a center bore 90 having an inside cylindrical surface that fits over the end of an axle of the vehicle when the wheel 80 is bolted to a hub assembly (not shown). A plurality of bolt apertures 96 surround the center bore 90 and extend from the front face 88 through to the backside surface, or wheel bolting face 98, of the center plate 84. As known to one of skill in the art, the bolting face 98 generally contacts a hub flange as the bolt apertures 96 slide around threaded studs extending from the hub assembly, after which a plurality of lug nuts are installed onto the threaded studs and tightened to draw together and hold the center plate 84 of the wheel 80 against the hub assembly.

In the illustrated embodiment, the inside cylindrical surface 92 of the center bore 90 includes a recess or groove 94 located proximate the front face 88 of the wheel 80. The groove 94 can be sized and shaped to receive attachment features that are formed into the ends of the first mounting clips 42 and the second mounting clips 62 extending from the inside faces of the outer piece 20 and the center piece 50, respectively (FIGS. 1-2).

Figure 4:
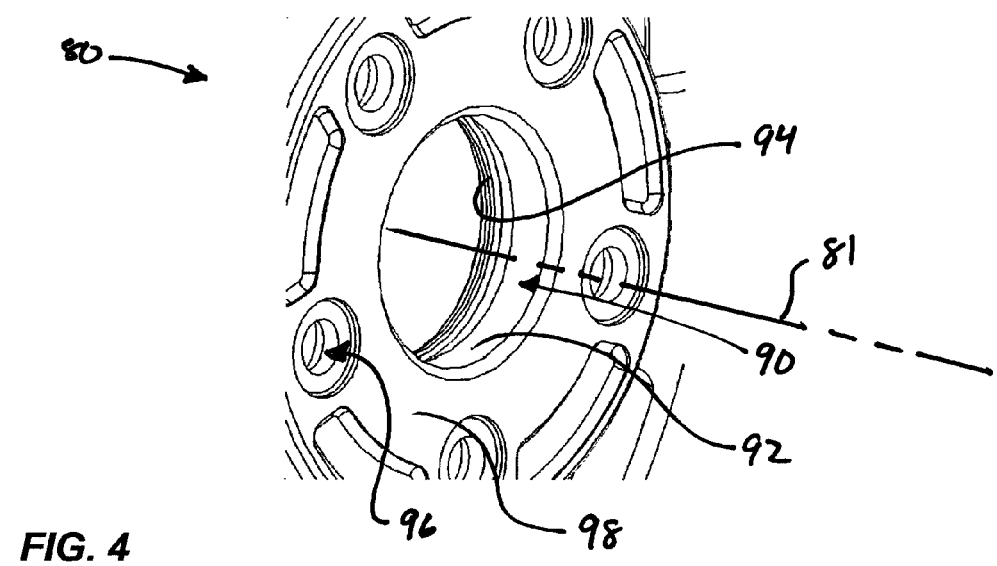
FIG. 4 is a close-up rear perspective view of a center bore formed into the wheel of FIG. 3.
Figure 5:
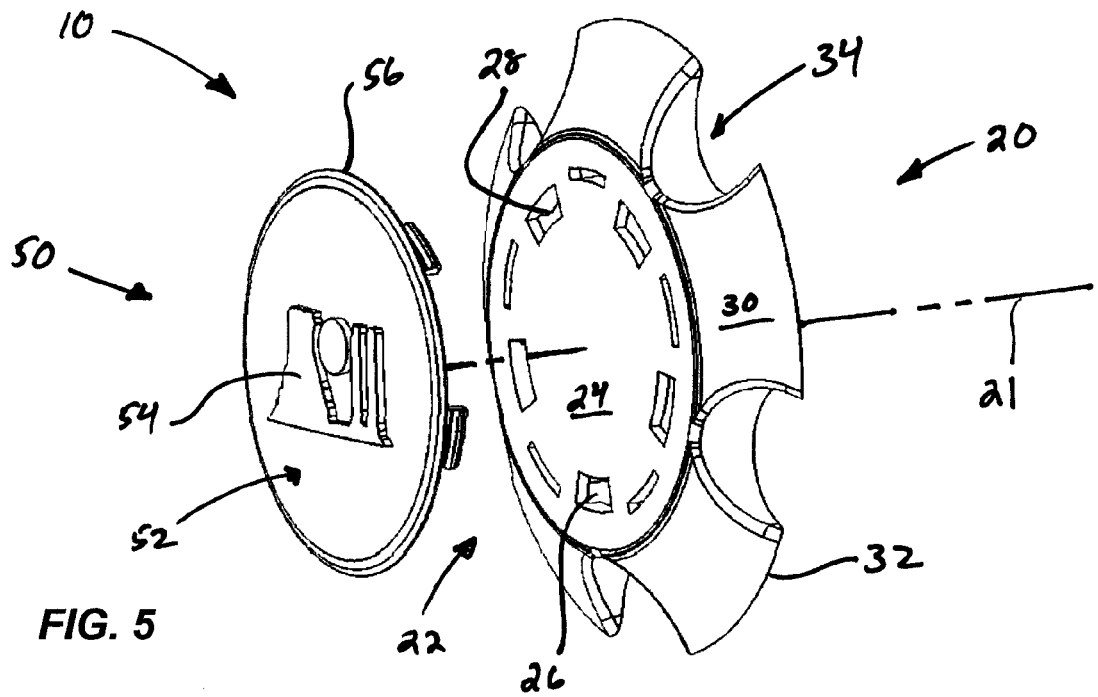
FIG. 5 is an exploded front perspective view of the modular center cap assembly of FIG. 1.
Figure 6:
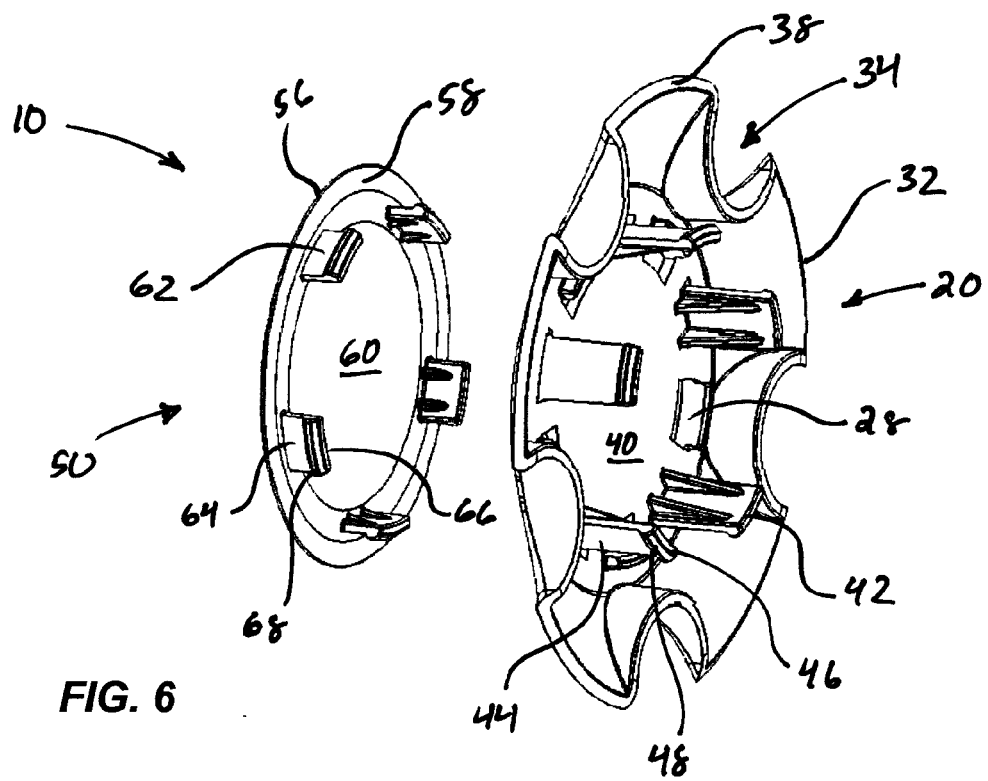
FIG. 6 is an exploded rear perspective view of the modular center cap assembly of FIG. 1.

FIGS. 5-6 are exploded perspective views of the modular center cap assembly 10 shown in FIGS. 1-2, and provide additional detail on the representative retention structures and mounting clips formed into the outer piece 20 and the center piece 50. For example, the first outward face 22 of the outer piece 20 can generally include a support portion 24 that is configured to receive and support the center piece. The support portion 24 can be surrounded by a shaped portion 30 that extends from the edge of the support portion 24 to the circumferential edge 32 of the outer piece 20, and generally includes a curved surface that is complimentary with the front face of the wheel to which it is to be attached. In one aspect, the shaped portion 30 can also include circular notches 34 configured to align around the bolt apertures 96 formed into the center plate 84 of the wheel 80 (FIGS. 3-4). The circular notches 34 can be sized with sufficient clearance to allow the lug nuts to be installed onto the threaded bolts with a lug wrench, with the head of the lug wrench being both movable axially and rotatable when positioned within the circular notches 34.

As can be seen in FIG. 5, the support portion 24 of the first outward face 22 can include the cap retention structure 26, that in one aspect can be a plurality of spaced slots or apertures 28 with grippable side edges formed through the thickness of the outer piece 20. The support portion 24 can also be substantially planar to provide a "landing" surface for the disc-shaped center piece 50 that is also substantially planar. However, it is contemplated that other embodiments of the modular center cap assembly can include a center piece having a curved body or curved inward surface 60, in which case that the support portion of the outer piece may also comprise a complimentary curved surface that has been configured to receive and support the center piece.

With reference to FIG. 6, the first inward surface 40 of the outer piece 20 includes a plurality of first mounting clips 42 that are configured to removably engage with the wheel retention structure to couple the outer piece 20 to the front face of the wheel. When the wheel retention structure comprises a groove 94 formed into the inside cylindrical surface 92 of the center bore 90 (FIGS. 3-4), the first mounting clips 42 can comprise first flexible members 44 having outwardly-directed hook features 48 formed into their distal ends 46, with the hook features 48 being configured to snap into place within the groove 94 when the outer piece 20 is mounted to the wheel. In addition, the first flexible members 44 can have a length between the first inward face 40 and the first distal ends 46 that causes the hook features 48 to engage with the groove 94 of the wheel 80 at substantially the same position that a first contact surface 38 contacts the front face 88 of the center plate 84 of the wheel 80 (FIGS. 3-4). As shown in the illustrated embodiment, the first contact surface 38 can be formed into the first inward face 40 of the outer piece 20 proximate the circumferential edge 32, and can provide a seal that limits or prevents moisture, oil, grease, dirt and sand from coming into contact with the center bore.

In one aspect, both the spaced slots or apertures 28 comprising the cap retention structure 26 and the first mounting clips 42 can be arranged in a circle having a diameter that is substantially equal to the diameter of the center bore, and where the circle can be centered on the centerline axis 21 of the outer piece 20. This results in the outer piece 20 being coupled to the wheel in a concentric position. In addition, the number of first mounting clips 42 can be equal the number of spaced apertures 28, and the first mounting clips 42 and the spaced apertures 28 can be angularly spaced from each other across the support portion 24 at substantially equal angular intervals.

Also shown in FIGS. 5-6, the center piece 50 can comprises a substantially disc-shaped body having the second outward face 52, the second inward face 60, and a plurality of second mounting clips 62 projecting from the second inward face. Similar to the first mounting clips 42 described above, the second mounting clips 62 comprise second flexible members 64 having outwardly-directed hook features 68 formed into their distal ends 66, with the hook features 68 being configured to snap into place within the spaced slots or apertures 28 forming the cap retention structure 26 when the center piece 50 is mounted to the outer piece 20. The second flexible members 64 can have a length between the second inward face 60 and the second distal ends 66 that causes the hook features 68 to engage with the side edges the apertures 28 at substantially the same position that a second contact surface 58 contacts the support portion 24 of the outer piece 20. As illustrated, the second contact surface 38 can be formed into the second inward face 60 proximate the circumferential edge 56 of the center piece 50, and can also provide a seal that limits or prevents moisture, oil, grease, dirt and sand from coming into contact with the center bore. The length of the second flexible members 64 can also allow the hook features 68 to engage with the groove 94 of the wheel 80 (FIGS. 3-4) at substantially the same position that the second contact surface 58 contacts the front face 88 of the center plate 84.

Also visible in FIG. 5, an embossed logo 54, lettering, or similar objects can be formed into or applied to the second outward face 52 of the center portion 50.

FIGS. 7-9 illustrate the modular cap assembly 10 coupled to and covering the center bore 90 of the wheel 80. In this configuration, the plurality of first mounting clips 42 of the outer piece 20 can extend into the center bore 90 a short distance. The first flexible members 44 of the mounting clips can be adapted to flex inward upon contact with the inside cylindrical surface 92 of the center bore as the outer piece 20 is pushed into position, and the hook features 48 formed into the distal ends 46 of the first flexible members 44 snap into place within the groove or recess 94 at substantially the same axial position that the first contact surface 38 contacts the front face 88 of the center plate 84 of the wheel 80 at a position spaced from the center bore 90. In addition, the hook features 48 can also be configured to slide within the groove 94 as the outer piece 20 is rotated relative to the wheel 80 to align the circular notches 34 with the bolt apertures 96.

In one aspect, the shaped portion 30 and/or the support portion of the outer piece 20 can be depressed or flexed inward in order for the hook features 48 to snap into the groove 94, so that the first flexible members 44 are placed into tension to hold the outer piece 20 in place against the center plate 84 of the wheel. Nevertheless, the shape of the hook features 48, the contour of the groove 94 and the compliance of the first flexible members 44 can also be configured to allow the outer piece 20 to be removed from the wheel 80 without breaking the first mounting clips 42, generally by the application of a prying force under the circumferential edge 32 of the outer piece 20 or by grasping the inside surfaces of the circular notches 34 and pulling the outer piece away from the wheel 80.

The center piece 50 may also be coupled to the outer piece 20 by inserting the second set of mounting clips 62 into the spaced apertures 28 formed through the support portion 24 of the outer piece 20. This action can take place either before or after installation of the outer piece 20 to the wheel. As best seen in FIG. 8, the overall thickness or depth of the outer piece 20 resulting from the curve of the shaped portion 30 can locate the second outward face 52 of the attached center piece 50 at a distance that is removed or spaced from the front face 88 of the center plate 84. This location can provide a desired visual aspect, or high profile appearance, to the center cap and wheel assembly while still protecting the end of the axle and allowing access to the lug nuts through the circular notches 34. In one aspect the distance or spacing between the second outward face 52 and the front face 88 of the center plate 84 can range from about 0.5 inches to about 1.5 inches, and can preferably be about 0.75 inches.

Figure 10:
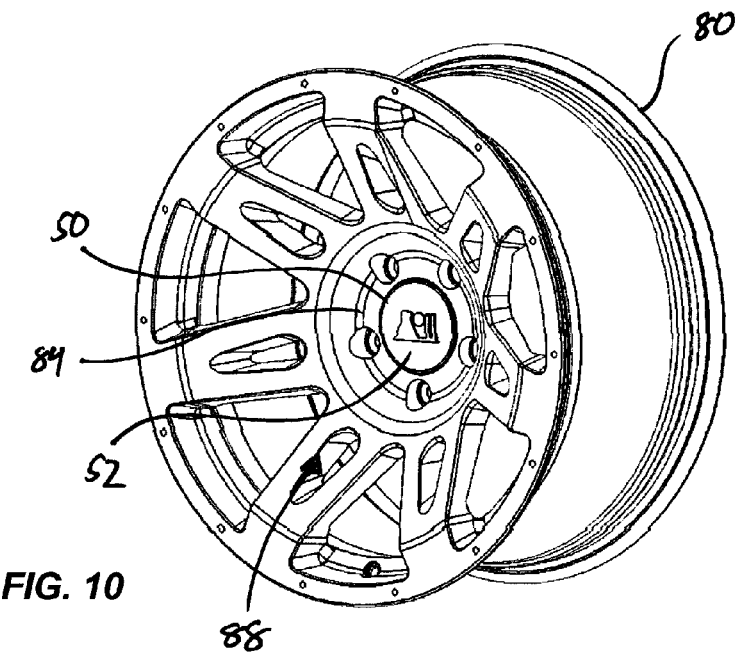
FIG. 10 is a front perspective view of the center piece of the modular center cap assembly of FIG. 1 coupled directly to the center bore of the wheel of FIG. 3.
Figure 11:
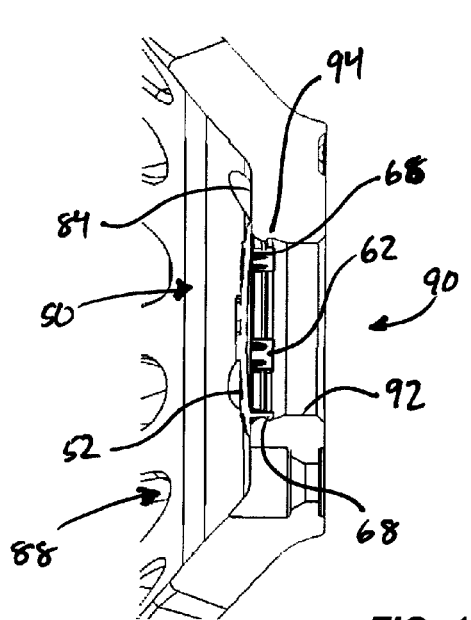
FIG. 11 is a close-up, cross-sectional side view of the center piece and center bore of FIG. 10.
Figure 12:
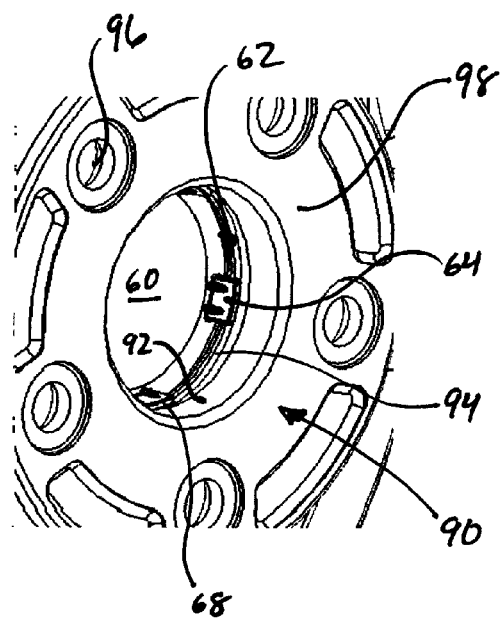
FIG. 12 is a close-up, rear perspective view of the center piece and center bore of FIG. 10.

With reference to FIGS. 10-12, the center piece 50 of the modular cap assembly may be separated from the outer piece and subsequently coupled directly to the wheel 80 to cover the center bore 90. As with the first mounting clips of the outer portion, the second flexible members 64 of the second mounting clips 62 can flex inward upon contact with the inside cylindrical surface 92 of the center bore 90 as the center piece 50 is pushed into position, and the hook features 68 formed into the distal ends 66 of the second flexible members 64 can also snap into place within the groove or recess 94. However, as the diameter of the center piece 50 is smaller than the diameter of the outer piece, the second contact surface 68 proximate the circumferential edge 56 of the second inward face 60 can contact the front face 88 of the center plate 84 at a location that is radially closer to the center bore 90.

In addition to the above, the plurality of second mounting clips 62 of the center piece 50 can also be configured to allow the center piece 50 to be rotated relative to the wheel 80 after coupling with the wheel, as well as allow the center piece 50 to be removed from the wheel 80 without breaking the second mounting clips 62. As best seen in FIG. 11, moreover, the thickness of the disc-shaped center piece 50 can be much less than the overall thickness or depth of the outer piece, leading to the second mounting clips 62 having lengths that are be much shorter than the lengths of the first mounting clips of the outer piece. This can also lead to the second outward face 52 of the center piece 50 being closer to or substantially flush with the front face 88 of the center plate 84. This location can provide the wheel assembly with a cleaner visual aspect or low profile appearance, while still allowing free access to the lug nuts installed within the bolt apertures 96 and protecting the end of the axle. In one aspect the distance or spacing between the second outward face 52 and the front face 88 of the center plate 84 can range from about 0 inches to about 0.5 inches, and can preferably be about 0.25 inches.

The invention has been described in terms of preferred embodiments and methodologies considered by the inventors to represent the best mode of carrying out the invention. However, a wide variety of additions, deletions, and modification might well be made to the illustrated embodiments by skilled artisans without departing from the spirit and scope of the invention. For example, while the material of the outer and center pieces can generally comprise a non-metal material such as a plastic, a thermoplastic, a fiber-embedded resin composite, and the like, the outer and center pieces may also be made from a lightweight aluminum alloy or various other metal alloys. In other aspects the outer and center pieces may comprise a composite of non-metal and metal materials. Similarly, the first contact surface of the outer piece and/or the second contact surface of the center piece can be coated with a gasket material or comparable compliant layer that can enhance the grip and the sealing provided by the center cap assembly. Moreover, the outer piece and the center piece can each include more than one contact surface to further improve the sealing characteristics of the assembly. These and other revisions might be made by those of skill in the art without departing from the spirit and scope of the invention that is constrained only by the following claims.

What is claimed is:

1. A cap assembly for covering a center bore of a wheel, the cap assembly comprising:
   an outer piece covering the center bore of the wheel and having a first outward face with a cap retention structure formed therein, a first inward face, and a plurality of first mounting clips projecting from the first inward face and adapted to removably engage a wheel retention structure and couple the outer piece to the wheel; and
   a center piece having a second outward face, a second inward face, and a plurality of second mounting clips projecting from the second inward face and adapted to removably engage, one at a time, both the cap retention structure and the wheel retention structure,
   wherein the second outward face is spaced from a wheel face when the center piece and outer piece are together coupled to the wheel, and
   wherein the second outward face is substantially flush with the wheel face when the center piece is coupled directly to the wheel.

2. The cap assembly of claim 1, wherein the first mounting clips further comprise first flexible members having first distal ends, the first distal ends being spaced from the first inward face and including hook features adapted to removably engage with the wheel retention structure.

3. The cap assembly of claim 2, wherein the second mounting clips further comprise second flexible members having second distal ends, the second distal ends being spaced from the second inward face and including hook features adapted to removably engage with the cap retention structure and the wheel retention structure.

4. The cap assembly of claim 3, wherein a length of the second flexible members is less than a length of the first flexible members.

5. The cap assembly of claim 3, wherein the cap retention structure further comprises a plurality of spaced apertures extending through the outer piece from the first outward face to the first inward face.

6. The cap assembly of claim 5, wherein the number of first mounting clips equals the number of spaced apertures, and wherein the first mounting clips and the spaced apertures are spaced from each other at substantially equal angular intervals.

7. The cap assembly of claim 1, wherein the wheel retention structure is formed into the center bore.

8. The cap assembly of claim 7, wherein the wheel retention structure further comprises a groove formed into an inside cylindrical surface of the center bore.

9. The cap assembly of claim 8, wherein the plurality of first mounting clips are arranged in a circle having a diameter that is substantially equal to a diameter of the center bore.

10. The cap assembly of claim 1, wherein the plurality of first mounting clips are configured to couple the outer piece to the wheel in a concentric position.

11. The cap assembly of claim 1, wherein the outer piece includes a circumferential edge having a plurality of circular notches formed therein, the circular notches being alignable with a plurality of bolt apertures in the wheel face surrounding the center bore.

12. A system for covering a center bore of a wheel, the system comprising:
   a wheel having a center plate, a center bore formed through the center plate, and a wheel retention structure formed in the center plate and proximate the center bore;
   an outer piece covering the center bore of the wheel and having a first outward face with a cap retention structure formed therein, a first inward face, and a plurality of first mounting clips projecting from the first inward face and adapted to removably engage the wheel retention structure and couple the outer piece to the wheel; and
   a center piece having a second outward face, a second inward face, and a plurality of second mounting clips projecting from the second inward face and adapted to removably engage, one at a time, both the cap retention structure and the wheel retention structure,
   wherein the second outward face is spaced from a front face of the center plate when the center piece and outer piece are together coupled to the wheel, and substantially flush with the front face when the center piece is coupled directly to the wheel.

13. The system of claim 12, wherein the first mounting clips further comprise first flexible members having first distal ends, the first distal ends being spaced from the first inward face and including hook features adapted to removably engage with the wheel retention structure.

14. The system of claim 13, wherein the second mounting clips further comprise second flexible members having second distal ends, the second distal ends being spaced from the second inward face and including hook features adapted to removably engage with the cap retention structure and the wheel retention structure.

15. The system of claim 14, wherein a length of the second flexible members is less than a length of the first flexible members.

16. The system of claim 14, wherein the cap retention structure further comprises a plurality of spaced apertures extending through the outer piece from the first outward face to the first inward face.

17. The system of claim 16, wherein the number of first mounting clips equals the number of spaced apertures, and wherein the first mounting clips and the spaced apertures are spaced from each other at substantially equal angular intervals.

18. The system of claim 12, wherein the wheel retention structure further comprises a groove formed into an inside cylindrical surface of the center bore.

19. The system of claim 18, wherein the plurality of first mounting clips are arranged in a circle having a diameter that is substantially equal to a diameter of the center bore.

20. The system of claim 12, wherein the outer piece includes a circumferential edge having a plurality of circular notches formed therein, the circular notches being alignable with a plurality of bolt apertures in the center plate surrounding the center bore.

* * * * *